UNITED STATES PATENT OFFICE.

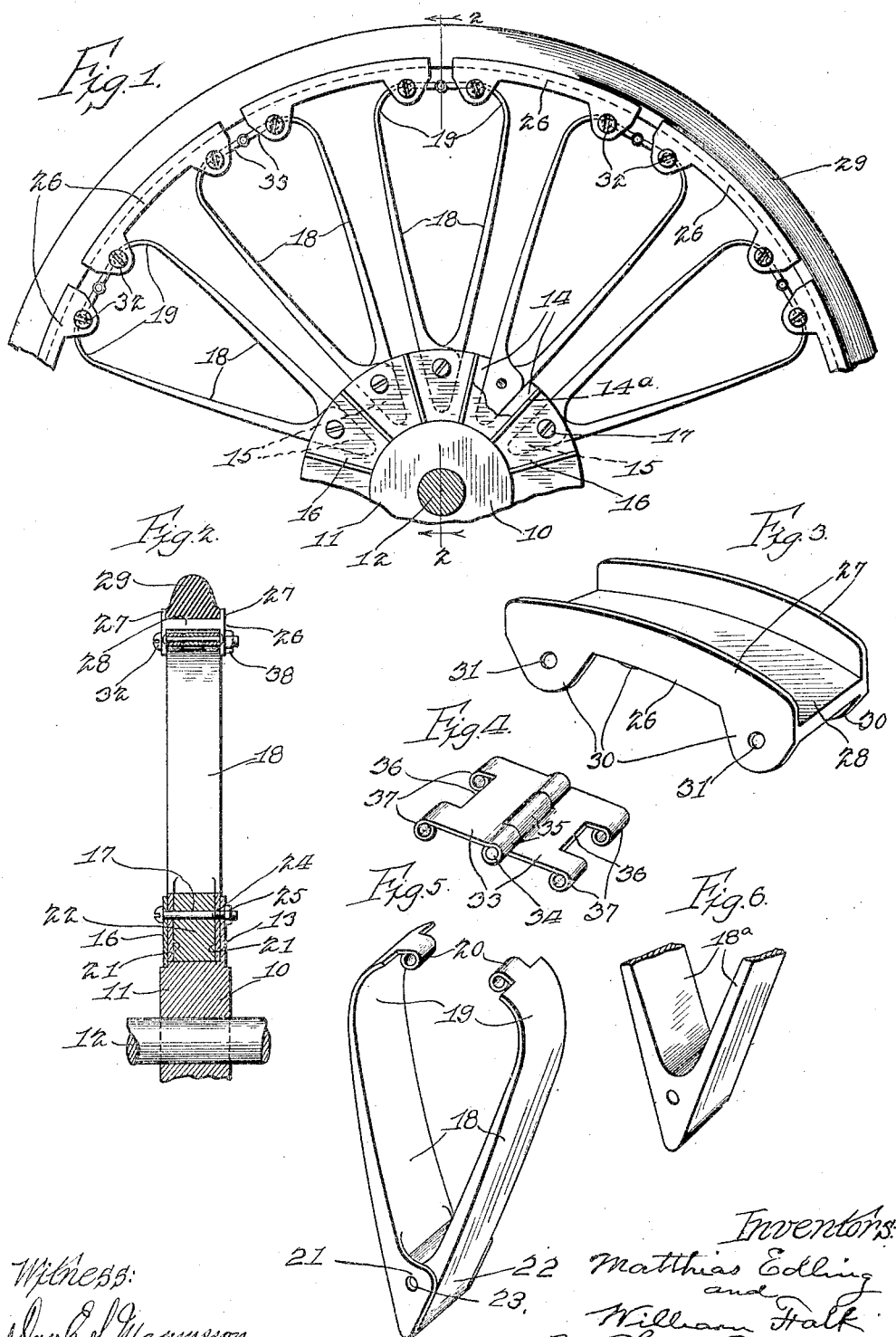

MATTHIAS EDLING AND WILLIAM FALK, OF IRON RIVER, MICHIGAN.

RESILIENT WHEEL.

1,345,912.  Specification of Letters Patent.  Patented July 6, 1920.

Application filed February 17, 1920. Serial No. 359,236.

*To all whom it may concern:*

Be it known that we, MATTHIAS EDLING and WILLIAM FALK, citizens of the United States, residing at Iron River, in the county of Iron and State of Michigan, have invented certain new and useful Improvements in Resilient Wheels, of which the following is a specification.

This invention relates to improvements in wheels to be used on vehicles of various kinds, but particularly on automobiles and auto-trucks, and it consists in certain peculiarities of the construction, novel arrangement, combination and operation of the various parts thereof as will be hereinafter more fully set forth and specifically claimed.

The principal object of our invention is to provide an efficient and practical resilient or spring wheel to be used as a substitute or in lieu of wheels equipped with the ordinary pneumatic tires, or in other words, to provide a wheel for autombiles and the like, the spokes of which shall be so constructed and arranged, that each spoke will share in supporting the hub of the wheel irrespective of the direction of pressure brought to bear thereon, thus permitting the wheel to yield in order to absorb the shock, as the wheel passes over obstacles or rough places in the road.

Another object of the invention is to provide a wheel of the above named general character, which shall be simple and inexpensive in construction, attractive in appearance, compact and light, yet strong and durable, with its parts easily and quickly assembled or detached for repairs, and one that will not be liable to rattle or to require attention when in use.

Other objects and advantages of the invention will be disclosed in the following description and explanation.

In the accompanying drawing, which serves to illustrate an embodiment of the invention, Figure 1 is a side view of a portion of a wheel, constructed according to our invention, showing a part thereof broken away adjacent the hub.

Fig. 2 is an enlarged sectional view taken on line 2—2 of Fig. 1, looking in the direction indicated by the arrows.

Fig. 3 is a detached perspective view of one of the sections of the sectional felly of the wheel.

Fig. 4 is a similar view of one of the hinges which are used for uniting said sections.

Fig. 5 is a detached perspective view of one form of one of the spring spokes, and Fig. 6 is a fragmental perspective view illustrating a modification in the construction of one of said spokes.

Like numerals of reference refer to corresponding parts throughout the different views of the drawing.

The hub is designated as a whole by the numeral 10 and comprises a cylindrical portion 11 which is provided centrally with an opening for the axle 12 and has at one of its ends an annular flange 13 which is by preference made integral with the cylindrical part 11 of the hub and has on its inner surface a series of radially disposed ribs 14 which provide tapered and radially arranged recesses 15 between said ribs for the reception of the inner ends of the spring spokes of the wheel. The opposite sides of the recesses 15 are closed by means of detachable plates 16 which are secured in position between radially disposed ribs 14ª on the ribs 14, by means of screw bolts 17 which are extended through suitable openings in said plates as well as openings in the flange 13 of the hub.

Located in each of the recesses 15 between the radial ribs 14 is a spoke which comprises a pair of springs 18 which have their outer extremities turned inwardly or toward each other as at 19 to form a resilient or cushioning support for the sections of the felly or rim and the tire which they support. As is clearly shown, each of the members 18 of each spoke is tapered or reduced outwardly and that each of said members has at its outer end a transversely disposed loop or collar 20 which are located midway between the side edges of said members. The opposite end of one of the members or springs 18 is provided at each of its edges with a transversely apertured flange 21 and the inner end of the other member 18 of each of the spokes is slightly enlarged as at 22 and provided with an opening to register with the openings 23 in the flanges 21 between which flanges the last named member is closely fitted. By this arrangement it is apparent that by placing the springs or members 18 in the position shown in Fig. 5 of the drawing, the inner ends of said springs or members can be readily located in one of the recesses 15 of the hub when it will be understood that the openings 23 in the flanges 21 and the opening in the member 18 located between said flanges will register with one of the screw-threaded openings 24 in the flange 13 and that one of the bolts 17 after having been passed through an opening in one of the plates 16 can be extended through the openings in the inner ends of the spring members 18 and the proper opening in the flange 13 in which position said parts may be securely held by screwing up a nut 25 on said bolt.

By reference to Figs. 1 and 3 of the drawing, it will be seen and understood that the felly or rim of the wheel consists of a series of segmental and channeled sections 26 each of which sections is provided at its sides with outwardly extended flanges 27 which together with the floor 28 provide a channel or seat for a tire 29, which in the present instance is shown as being of the solid rubber type, but we desire it to be understood that we may use a pneumatic tire or a semi-pneumatic one or a tire of any suitable construction and material.

At each of its ends each of the sections 26 is provided with inwardly extended lugs or enlargements 30 each of which is provided with a transverse opening 31 for the reception of bolts 32 which are extended through the loops or collars 20 on the outer or inturned portions 19 of the spring members 18 comprising each spoke. By again referring to Fig. 1 of the drawing, it will be seen that the sections 26 are united at their adjacent ends by means of hinges, each of which comprises a pair of plates 33, see Fig. 4, which are hinged together at their meeting edges by means of a pintle 34 extended through suitable loops or collars 35 formed on said plates. At its outer end each of the plates 33 is provided with a recess 36 and on each side of said recess with a loop or collar 37 for the reception of the bolts 32 for it will be seen and understood that said bolts are employed not only for pivotally connecting the outer ends of the spring members 18 to the lugs or enlargements 30 of the sections 26 of the rim or felly, but also for connecting the plates 33 of the hinges thereto.

In assembling the parts, the loops or collars 20 on the spring members are located in the recesses 36 of the hinges so that the openings in said collars will register with the openings in the collars or loops 37 of the hinges and thus permit the bolts 32 to be readily inserted, in which position they may be securely held by means of nuts 38 engaging one end of said bolts.

It will be observed by reference to Fig. 1, that the sections 26 are spaced apart at their ends and that the hinges will normally hold them in such positions, but will permit of their movements under stress or pressure. It will also be noted in said figure of the drawing that the adjacent members 18 of the adjacent spokes are connected at their outer ends to different sections 26 of the felly or rim, and it will be understood that by inturning the springs 18 of each spoke as shown at 19 and that by reducing or tapering said springs outwardly the resiliency will be maintained at the proper point.

In Fig. 6 of the drawing, we have shown a slight modification in the construction of the spokes of the wheel, which consists in making the spring members $18^a$ thereof of a single piece of material instead of two pieces, as shown in Fig. 5 and above described. Otherwise, this modified form is the same in construction as that previously described and performs the same functions.

Having thus fully described our invention, what we claim as new and desire to secure by Letters Patent is—

In a wheel of the class described, the combination with a hub, of a series of spokes mounted at their inner ends on said hub and extended in substantially radial lines therefrom with their faces located in planes at right angles to the faces of the wheel, each spoke comprising a pair of outwardly tapered single spring members having their outer portions curved toward each other and provided with transverse openings, a sectional felly mounted on the outer ends of said members, each section of said felly having transverse openings near each of its ends, hinges uniting the ends of the felly sections, each of said hinges comprising a pair of plates hinged together at their meeting edges and having in their opposite edges transverse and spaced apart openings to receive therebetween the apertured portions of the spring members of the spokes, bolts extended through the openings of the felly sections, the openings of the hinges and the openings of said spring members, one of the members of each spoke being thus connected at its outer end to one of the felly sections and the other member thereof similarly connected at its outer end to the felly section adjacent the first named section, and a tire mounted on the felly sections.

MATTHIAS EDLING.
WILLIAM FALK.